US006731642B1

(12) United States Patent
Borella et al.

(10) Patent No.: US 6,731,642 B1
(45) Date of Patent: May 4, 2004

(54) INTERNET TELEPHONY USING NETWORK ADDRESS TRANSLATION

(75) Inventors: Michael S. Borella, Naperville, IL (US); Nurettin B. Beser, Evanston, IL (US); Ikhlaq S. Sidhu, Vernon Hills, IL (US); Guido M. Schuster, Des Plaines, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/303,832

(22) Filed: May 3, 1999

(51) Int. Cl.[7] .......................... H04L 12/28; H04L 12/66
(52) U.S. Cl. ........................................ 370/401; 370/356
(58) Field of Search ................................ 370/475, 389, 370/410, 352–356, 392, 400–401; 379/207.05–207.09, 221.14, 229, 258

(56) References Cited

U.S. PATENT DOCUMENTS

| | | | |
|---|---|---|---|
| 4,953,198 A | 8/1990 | Daly et al. ..................... 379/61 |
| 5,159,592 A | 10/1992 | Perkins ........................ 370/85.7 |
| 5,227,778 A | 7/1993 | Vacon et al. ............. 340/825.52 |
| 5,327,365 A | 7/1994 | Fujisaki et al. .............. 364/717 |
| 5,497,339 A | 3/1996 | Bernard ...................... 364/705.5 |
| 5,526,353 A | 6/1996 | Henley et al. |
| 5,526,489 A | 6/1996 | Nilakantan et al. ...... 395/200.2 |
| 5,550,984 A | 8/1996 | Gelb ....................... 395/200.17 |
| 5,604,737 A | 2/1997 | Iwami et al. |
| 5,606,594 A | 2/1997 | Register et al. ................ 379/58 |
| 5,636,216 A | 6/1997 | Fox et al. |
| 5,654,957 A | 8/1997 | Koyama |
| 5,708,655 A | 1/1998 | Toth et al. ..................... 370/313 |
| 5,737,333 A | 4/1998 | Civanlar et al. |
| 5,742,596 A | 4/1998 | Baratz et al. |

(List continued on next page.)

FOREIGN PATENT DOCUMENTS

WO    WO 01/31888 A1    5/2001    ........... H04L/29/06

OTHER PUBLICATIONS

Newton, Newton's Telecom Dictionary, 1998, Telecom Books, p. 262.*
ITU–T Recommendation H.225.O, *Call Signaling Protocols and Media Stream Packetization for Packet–Based Multimedia Communication Systems*, Series H: Audiovisual and Multimedia Systems —Infrastructure of Audiovisual Services—Transmission Multiplexing and Synchronization, (Feb., 1998).

(List continued on next page.)

Primary Examiner—Melvin Marcelo
Assistant Examiner—Ronald Abelson
(74) Attorney, Agent, or Firm—McDonnell Boehnen Hulbert & Berghoff (57) ABSTRACT

A system and method for Internet telephony between a caller station and a callee station are described. The caller station is connected to a first edge network via a first telephony interface, and the callee station is connected to a second edge network via a second telephony interface. An intermediate network is connected to the first edge network via a first router and is connected to the second edge network via a second router. The callee station is associated with a callee station number. The first router initiates the call in response to a setup message that includes the callee station number. A first gatekeeper, controlling the first router, and a second gatekeeper, controlling the second router, together mediate the process of setting up the call. A back end server, in communication with the first and second gatekeepers, stores the addresses and station numbers needed to set up the call. During the call, the first router performs network address translation to transmit signals between the first edge network and the Internet, and the second router performs network address translation to transmit signals between the second edge network and the Internet.

32 Claims, 4 Drawing Sheets

U.S. PATENT DOCUMENTS

| | | | |
|---|---|---|---|
| 5,754,547 A | 5/1998 | Nakazawa | 370/401 |
| 5,793,657 A | 8/1998 | Nemoto | 364/717.01 |
| 5,793,763 A | 8/1998 | Mayes et al. | |
| 5,812,819 A | 9/1998 | Rodwin et al. | 395/500 |
| 5,835,723 A | 11/1998 | Andrews et al. | 395/200.56 |
| 5,862,331 A | 1/1999 | Herriot | 395/200.49 |
| 5,867,495 A | 2/1999 | Elliott et al. | |
| 5,867,660 A | 2/1999 | Schmidt et al. | 395/200.57 |
| 5,872,847 A | 2/1999 | Boyle et al. | 380/25 |
| 5,889,774 A | 3/1999 | Mirashrafi et al. | |
| 5,892,924 A | 4/1999 | Lyon et al. | 395/200.75 |
| 5,915,008 A | 6/1999 | Dulman | 379/201 |
| 5,933,778 A | 8/1999 | Buhrmann et al. | 455/461 |
| 5,950,195 A | 9/1999 | Stockwell et al. | 707/4 |
| 6,011,782 A | 1/2000 | DeSimone et al. | 370/260 |
| 6,055,236 A | 4/2000 | Nessett et al. | 370/389 |
| 6,055,561 A | 4/2000 | Feldman et al. | 709/200 |
| 6,058,421 A | 5/2000 | Fijolek et al. | 709/225 |
| 6,079,021 A | 6/2000 | Abadi et al. | 713/202 |
| 6,101,189 A | 8/2000 | Tsuruoka | 370/401 |
| 6,101,543 A | 8/2000 | Alden et al. | 709/229 |
| 6,104,711 A | 8/2000 | Voit | 370/352 |
| 6,115,751 A | 9/2000 | Tam et al. | 709/240 |
| 6,134,591 A | 10/2000 | Nickles | 709/229 |
| 6,137,791 A | 10/2000 | Frid et al. | 370/352 |
| 6,157,950 A | 12/2000 | Krishnan | 709/223 |
| 6,172,986 B1 | 1/2001 | Watanuki et al. | 370/466 |
| 6,185,184 B1 | 2/2001 | Mattaway et al. | 370/230 |
| 6,195,705 B1 | 2/2001 | Leung | 709/245 |
| 6,212,183 B1 | 4/2001 | Wilford | 370/392 |
| 6,212,563 B1 | 4/2001 | Beser | 709/227 |
| 6,222,859 B1 * | 4/2001 | Yoshikawa | 370/522 |
| 6,233,234 B1 * | 5/2001 | Curry et al. | 370/356 |
| 6,249,820 B1 | 6/2001 | Dobbins et al. | 709/238 |
| 6,252,544 B1 * | 6/2001 | Hoffberg | 342/357.1 |
| 6,256,662 B1 * | 7/2001 | Lo et al. | 709/203 |
| 6,266,707 B1 | 7/2001 | Boden et al. | 709/245 |
| 6,269,099 B1 | 7/2001 | Borella et al. | 370/389 |
| 6,324,279 B1 * | 11/2001 | Kalmanek et al. | 379/229 |
| 6,353,614 B1 * | 3/2002 | Borella et al. | 370/389 |
| 6,353,891 B1 | 3/2002 | Borella et al. | 713/201 |
| 6,434,134 B1 * | 8/2002 | La Porta et al. | 370/338 |
| 6,453,156 B1 * | 9/2002 | Center et al. | 455/161.3 |

OTHER PUBLICATIONS

ITU–T Recommendation H.323, *Packet–Based Multimedia Communications Systems*, Series H: Audiovisual and Multimedia Systems—Infrastructure of Audiovisual Serivces—Systems and Terminal Equipment for Audiovisual Services, (Feb., 1998).

Handley, M., et al., *SIP: Session Initiation Protocol*, Network Working Group, Request for Comments 2543, Mar. 1999, pp. 1 to 115.

Srisuresh, P. et al., *IP Network Address Translator (NAT) Terminology and Considerations*, "<draft–ietf–nat–terminology–0.1.txt>," NAT Working Group Internet Draft, Oct., 1998, pp. 1 to 26.

G. Montene, Internet Engineering Task Force, Internet Draft, "Negotiated Address Reuse" (NAR), <draft–montenegro–aatn–nar–00.txt>, May 1998, pp. 1–22.

George Tsirtsis, Alan O'Neill, Internet Engineering Task Force, Internet Draft, "NAT Bypass for End 2 End 'Sensitive' Applications," <draft–tsirtsis–nat–bypass–00.txt>, Jan. 1998, pp. 1 to 5.

George Tsirtsis, Pyda Srishuresh, Internet Engineering Task Force, Internet Draft, "Network Address Translation—Protocol Translation" (NAT–PT), <draft–ietf–ngtrans–natpt–04.txt>, Jan. 1999, pp. 1 to 13.

Jeffrey Lo, K. Taniguchi, Internet Engineering Task Force, Internet, Draft, "IP Host Network Address (and port) Translation," <draft–ietf–nat–hnst–00.txt>, Nov. 1998, pp. 1 to 13.

Michael Borella, David Grabelsky, Ikhlaq Sidhu, Brian Petry, Internet Engineering Task Force, Internet Draft, "Distributed Network Address Translation," <draft–borella–aatn–dnat–01.txt>, Oct. 1998, pp. 1 to 21.

P. Srisuresh, G. Tsirtsis, P. Akkiraju, A. Heffernan, Internet Engineering Task Force, Internet Draft, "DNS Extensions to Network Address Translators" (DNS_ALG), <draft–ietf–nat–dns–alg–01.txt>, Oct. 1998, pp. 1 to 24.

P. Srisuresh, Internet Engineering Task Force, Internet Draft "Security for IP Network Address Translator (NAT) Domains," <draft–ietf–nat–security–00.txt.>, Nov. 1998, pp. 1 to 11.

P. Srisuresh, K. Eg, Internet Engineering Task Force, Internet Draft, "The IP Network Address Translator" (NAT), <draft–rfced–info–srisuresh–05.txt>, Feb. 1998, pp. 1 to 24.

P. Srisuresh, K. Egev, Internet Engineering Task Force, Internet Draft, "Traditional IP Network Address Translator (Traditional NAT)," <draft–ietf–nat–traditional–01.txt>, Oct. 1998, pp. 1 to 17.

Praveen Akkiraju, Yakov Rekhter, Internet Engineering Task Force, Internet Draft, "A Multihoming Solution Using NATs" <draft–akkiraju–nat–multihoming–00.txt>, Nov. 1998, pp. 1 to 32.

R.G. Moskowitz, Internet Engineering Task Force, Internet Draft, "Network Address Translation Issues with IPsec," <draft–moskowitz–net66–vpn–00.txt>, Feb. 6, 1998, pp. 1 to 8.

R. Thay, N. Doraswa and R. Gle, Internet Engineering Task Force, Internet Draft "IP Security," <draft–ietf–ipsec–doc–roadmap–02.txt>, Nov. 1997, pp. 1 to 12.

T. Hain, Internet Engineering Task Force, Internet Draft, "Architectural Implications of NAT," <draft–iab–nat–implications–02.txt>, Oct. 1998, pp. 1 to 14.

W.T. Teo, S.W. Yeow, R. Singh, Internet Engineering Task Force, Internet Draft, "IP Relocation Through Twice Network Address Translators," <draft–ietf–nat–mat–00.txt>, Feb. 1999, pp. 1 to 20.

W.T. Teo, S.W. Yeow, R. Singh, Internet Engineering Task Force, Internet Draft, "Reverse Twice Network Address Translators" (RAT),"<draft–teoyeow–mip–rat–01.txt>," Dec. 1998, pp. 1 to 20.

W.T. Teo, Y. Li, Internet Engineering Task Force, Internet Draft, "Mobile IP Extension for Private Internets Support," <draft–teoyli–mobileip–mvpn–02.txt>, Feb. 1999, pp. 1 to 24.

Yakov Rekhter, Internet Engineering Task Force, Internet Draft, "Implications of NATs on the TCP/IP Architecture," <draft–ietf–nat–arch–implications–00.txt>, Feb. 1999, pp. 1 to 7.

K. Egevang, and P. Francis, Internet Engineering Task Force, ("IETF"), Request for Comments ("RFC") RFC–1631, "The IP Network Address Translator (NAT)", May 1994, pp. 1–10.

Borella, Michael, *Technology Update—Protocol Helps Stretch IPv4 Addresses*, "Network World", vol. 17, No. 3, Jan. 17, 2000, p. 43.

Kent, Stephen, *Evaluating Certification Authority Security*, Aerospace Conference, 1998 IEEE, Online, vol. 4, pp. 319–327 (Mar. 21–23, 1998).

Thayer, Rodney, *Bulletproof IP With Authentication and Encryption IPSec Adds a Layer of Armor to IP*, Data Communications, vol. 26, No. 16, pp. 55–58, 60 (Nov. 21, 1997).

Borella, M., Grabelsky, D., Lo, J., Tuniguchi, K., Internet Engineering Task Force, Internet Draft, "Realm Specific IP: Protocol Specification <draft–ietf–nat–rsip–protocol–.06.txt>", Mar. 2000, pp. 1–48.

Borella, M., Grabelsky, D., Lo, J., Tuniguchi, K., Internet Engineering Task Force, Internet Draft, "Realm Specific IP: Protocol Specification <draft–ietf–nat–risp–protocol–.07.txt>", Jul. 2000, pp. 1–49.

Montenegro, G., Internet Engineering Task Force, Internet Draft, "RSIP Support for End–to–End IPsec," <draft–ietf–nat–rsip–ipsec–04.txt>, Jul. 2000, pp. 1 to 17.

Borella, M., Lo, J., Grabelsky, D., Montenegro, G., Internet Engineering Task Force, Internet Draft, "Realm Specific IP: Framework <draft–ietf–nat–rsip–framework–.05.txt>", Jul. 2000, pp. 1–30.

Borella, M., Montenegro, G., *RSIP: Address Sharing with End–To–End Security*, USENIX Conference, San Francisco, California, Mar. 9, 2000, pp. 1–9.

McCanne et al., "The BSD Packet Filter: A New Architecture for User–Level Packet Capture," Proceedings of the 1993 Winter USENIX Technical Conference (Jan. 1993).

Postel, J., *User Datagram Protocol*, Request for Comments 768, Aug. 1980, pp. 1 to 3.

Postel, J., *Internet Protocol*, Request for Comments 791, Sep. 1981, pp. I to 45.

Postel J., *Internet Control Message Protocol*, Request for Comments 792, Sep. 1981, pp. 1 to 21.

Postel, J., *Transmission Control Protocol*, Request for Comments 793, Sep. 1981, pp. i to 84.

Postel, J., *File Transfer Protocol (FTP)*, Request for Comments 959, Oct. 1985, pp. 1 to 69.

Jacobson, V., *TCP Extensions for High Performance*, Request for Comments 1323, May 1992, pp. 1 to 37.

Droms, R., *Dynamic Host Configuration Protocol*, Request for Comments 2131, Mar. 1997, pp. 1 to 45.

Stevens, W., *Advanced Sockets API for IPv6*, Request for Comments 2292, Feb. 1998, pp. 1 to 67.

Gilligan, R. et al., *Basic Socket Interface Extensions for IPv6*, Request for Comments 2553, Mar. 1999, pp. 1 to 41.

Srisuresh, P.,et al., *IP Network Address Translator (NAT) Terminology and Considerations*, Request for Comments 2663, Aug. 1999, pp. 1 to 30.

Maurice J. Bach, The Design of the Unix Operating System, Prentice Hall Software Series, 1986, pp. 382–390.

"Cisco IOS Release 12.0 Network Protocols Configuration Guide, Part 1", Configuring IP Addressing, Cisco Systems, 1998, pp. PIC–7 to PIC–58.

Durand, Alain, *Deploying Ipv6*, IEEE Internet Computing, http://computer.org/internet, Jan.–Feb. 2001, pp. 79–81.

3COM SIP Solutions 1.0 benefits brochure. (4 total pages).

Sidhu, Ikhlaq and Bezaitis, Andrew, Eat or be eaten, www.americasnetwork.com/issues/99issues/991101/991191eat.htm, printed May 10, 2000. (6 total pages).

Myers, Brad A.; Stiel, Herb; and Gargiulo, Robert, Collaboration Using Multiple PDAs Connected to a PC, Proceedings of the ACM 1998 conference on Computer supported cooperative work, Nov. 14–18, 1998, Seattle, WA. (total 11 pages).

Dalgic, Ismail; Borella, Michael; Dean, Rick; Grabiec, Jacek; Mahler, Jerry; Schuster, Guido; and Sidhu, Ikhlaq, True Number Portability and Advanced Call Screening in a SIP–Based IP Telephony System, *IEEE Communications Magazine*, vol. 37, No. 7, Jul. 1999, pp. 96–101. (8 total pages).

Handley/Schulzrinne/Schooler/Rosenberg, SIP: Session Initiation Protocol, Internet Engineering Task Force, draft–ietf–sip–rfc2543bis–02.ps. Sep. 4, 2000. (131 pages).

Borella, M., Lo, J., Grabelsky, D., Montenegro, G., IETF Proceedings presentation, Realm Specific IP: Protocol Specification <draft–nat–rsip–protocol–00.txt>, Apr. 9, 1999 (13 pages).

Marsan, Carolyn Duffy, The Next Best Things to Ipv6? Network World Fusion at http://www.nbwfusion.com/news/1999/0920ipv6.html, Mar. 29, 2000, pp. 1–3.

Borella, M., Lo, J., Grabelsky, D., Montenegro, G., Internet Engineering Task Force, Internet Draft, "Realm Specific IP: Framework <draft–ietf–nat–rsip–framework–.04.txt>", Mar. 2000, pp. 1–30.

IETF Mar. 1999 Proceedings, 2.7.10 Network Address Translators (nat), pp. 1–13.

Rosenberg, Jonathan D. and Shockey, Richard, The Session Initiation Protocol (SIP): A Key Component for Internet Telephony, ComputerTelephony.com, Jun. 2000, pp. 124–139.

Fenner, W., *Internet Group Management Protocol Version 2*, RFC 2236, Nov. 1997, pp. 1–24.

Mogul, J. et al., "*Internet Standard Subnetting Procedure*", RFC 950, Aug., 1985, pp. 1–18.

Schulzrinne et al., "RTP: A Transport Protocol for Real–Time Applications", RFC 1889, pp. 1–75.

Privat, Jermone, "*Double Phase DHCP Configuration*", <draft–privat–dhc–doublephase–01.txt>, Internet Engineering Task Force, Sep. 1999, pp. 1–4.

Maughan, D. et al., "*Internet Security Association and Key Management Protocol*", RFC 2408, Nov. 1998, pp. 1–86.

Karn, P., "*Photuris Session–Key Management Protocol*", RFC 2522, Mar. 1999, pp. 1–58.

"Random Number Generators", Computational Science Education Project, 1991, 1992, 1993, 1994 and 1995.

Foster, Ian, "*10 Random Numbers*", 1995.

Borella, Michael et al., "*Realm Specific IP: Protocol Specification*", <draft–ietf–nat–rsip–protocol–02.txt>, Internet Draft, Aug. 1999, pp. 1–27.

Gilligan, R. et al., "*Transition Mechanisms for IPv6 Hosts and Routers*", RFC 1933, Apr. 1996, pp. 1–22.

Afifi, H. et al., "*Method for IPv4–IPv6 Transition*", Proceedings IEEE International Symposium on Computers and Communications, Jul. 6–8, 1999, pp. 478–484.

* cited by examiner

INTERNET TELEPHONY USING NETWORK ADDRESS TRANSLATION

BACKGROUND OF THE INVENTION

A. Field of the Invention

This invention relates to the technology presently known as Internet telephony (sometimes referred to in the art as IP Telephony, where IP stands for Internet Protocol), in which signals from a caller station, such as a telephone, fax machine, modem, or video device, are transmitted, in the form of digital data packets, across a digital data network to a callee station. More particularly, this invention relates to a system and a method for Internet telephony that uses network address translation to translate the source and destination addresses of the digital data packets as they are transmitted from the address space of one network to the address space of another network.

B. Description of Related Art

Internet telephony is becoming an increasingly attractive alternative to the conventional public switched telephone network (PSTN) for long distance telephone calls because of its much lower cost and enhanced flexibility. To make a long distance telephone call using Internet telephony, a caller typically need only make a local telephone call to a local Internet telephony service provider. The Internet service provider then routes the telephone call to the Internet, often by using a gateway or terminal functioning in accordance with the H.323 and H.225 ITU-T standards. The H.323 and H.225 ITU-T standards are incorporated herein by reference. Another protocol that has been proposed is the "Session Initiation Protocol" (SIP). The most recent version of SIP is described in the Network Working Group's Request for Comments 2543 (March 1999), which is incorporated herein by reference.

Once the telephone call is routed to the Internet, its transmission is, for all practical purposes, free, regardless of its destination. Accordingly, in contrast to long distance service on the PSTN, which may charge users 10 to 30 cents per minute for domestic calls and considerably more for international calls, the cost of a long distance call using Internet telephony is potentially the cost of two local telephone calls (one at the calling end and one at the receiving end).

One problem with this conventional implementation of Internet telephony, however, is that it is not as user-friendly as the PSTN. Specifically, when a user desires to route a telephone call using conventional Internet telephony, the user typically must call a special telephone number, i.e., the telephone number of the Internet telephony service provider, and then dial the telephone number of the desired destination. In contrast, to use the PSTN, the user need only dial the telephone number of the desired destination.

One possible solution to this problem would be to bypass the PSTN entirely and provide telephones with direct Internet access. However, providing an Internet address for each telephone that uses Internet telephony may not be practical because of the increasingly limited number of available Internet addresses.

Finally, conventional Internet telephony has problems with privacy and security. The privacy concern relates to the extent to which the caller and callee can remain anonymous. The security concern relates to how easily an unauthorized party can gain access to the system, such as to make long distance calls without paying for them.

SUMMARY OF THE INVENTION

In a first principal aspect, a system is provided for routing a call between a caller station, connected to an edge network, and a callee station, accessible via an intermediate network. The callee station is associated with a callee station number. A router, connecting the edge network to the intermediate network, initiates the call in response to a setup message that includes the callee station number. During the call, the router performs network address translation on the caller signal from the caller station in order to transmit the signal from the edge network to the intermediate network. Similarly, the router performs network address translation on the callee signal from the callee station in order to transmit the signal from the intermediate network to the edge network.

In a second principal aspect, a system is provided for routing a call between a caller station, connected to an edge network, and a callee station, accessible via an intermediate network. The callee station is associated with a callee station number. A routing means initiates the call in response to a setup message that includes the callee station number. During the call, the routing means performs network address translation on the caller signal from the caller station in order to transmit the signal from the edge network to the intermediate network. Similarly, the routing performs network address translation on the callee signal from the callee station in order to transmit the signal from the intermediate network to the edge network. A gatekeeper means controls the routing means.

In a third principal aspect, an improvement is provided to a communication system for routing a call between a caller station and a callee station. The communication system includes the caller station, connected to an edge network, and the callee station, accessible via an intermediate network. The callee station is associated with a callee station number. The improvement comprises a router, connecting the edge network to the intermediate network that initiates the call in response to a setup message that includes the callee station number. During the call, the router performs network address translation on the caller signal from the caller station in order to transmit the signal from the edge network to the intermediate network. Similarly, the router performs network address translation on the callee signal from the callee station in order to transmit the signal from the intermediate network to the edge network.

In a fourth principal aspect, a method is provided for setting up a call over an intermediate network from a caller station, connected to an edge network, to a callee station, accessible via the intermediate network. The callee station is associated with a callee station number. A setup message, which includes the callee station number, is received from the edge network. A proxy public caller address is then allocated to identify the caller station on the intermediate network, and a proxy private callee address is allocated to identify the callee station on the edge network.

In a fifth principal aspect, a method is provided for communicating over an intermediate network between a caller station, connected to an edge network, and a callee station, accessible via the intermediate network. A caller signal comprising first caller data packets is received from the edge network. Network address translation is performed in the first caller data packets to provide second caller data packets that are then transmitted over the intermediate network.

In a sixth principal aspect, a method is provided for registering a caller station with a server. The server receives a registration message that includes a caller station number, a caller address, as well as the public addresses of the router and gatekeeper associated with the caller station. The server then stores the information in a database.

In a seventh principal aspect, a system is provided for setting up a call between a caller station, connected to an edge network, and a callee station accessible via the intermediate network, where the intermediate network is connected to the edge network by a router. The system comprises a gatekeeper, connected to the intermediate network, that controls when the router allocates a proxy public caller address to identify the caller station on the intermediate network and when the router allocates a proxy private callee address to identify the callee station on the edge network.

In general, a preferred embodiment of the present invention provides a system and method for Internet telephony that allows for long distance calls at a lower cost than the PSTN while still being as easy to use as the PSTN. Specifically, the user is able to route a call by dialing only the telephone number of the desired destination, without first calling a special telephone number.

The preferred embodiment of the present invention, though independent of the PSTN altogether, substantially conserves Internet address space by using network address translation. In particular, a caller station has a fixed caller address on a first edge network and a callee station has a fixed callee address on a second edge network. The caller and callee stations are allocated Internet addresses only when a call is being set up between them. Network address translation is used to transmit the signals between the Internet and the first edge network and is also used to transmit signals between the Internet and the second edge network. Moreover, once the call is completed, the Internet addresses will be available for other stations to use.

Privacy and security concerns are also addressed by the preferred embodiment of the present invention. Through the use of proxy addresses, one side of the call does not have access to the private addresses of the other side. This provides an important measure of privacy. Security is also enhanced because several different components, namely two routers, two gatekeepers, and a back end server, must all work together to set up a call. The distributed nature of the system makes unauthorized access much more difficult.

BRIEF DESCRIPTION OF THE DRAWINGS

Presently preferred forms of the invention are depicted in the drawings, where like reference numerals refer to like elements in the various figures, and wherein.

DETAILED DESCRIPTION OF THE INVENTION

Figure 1:
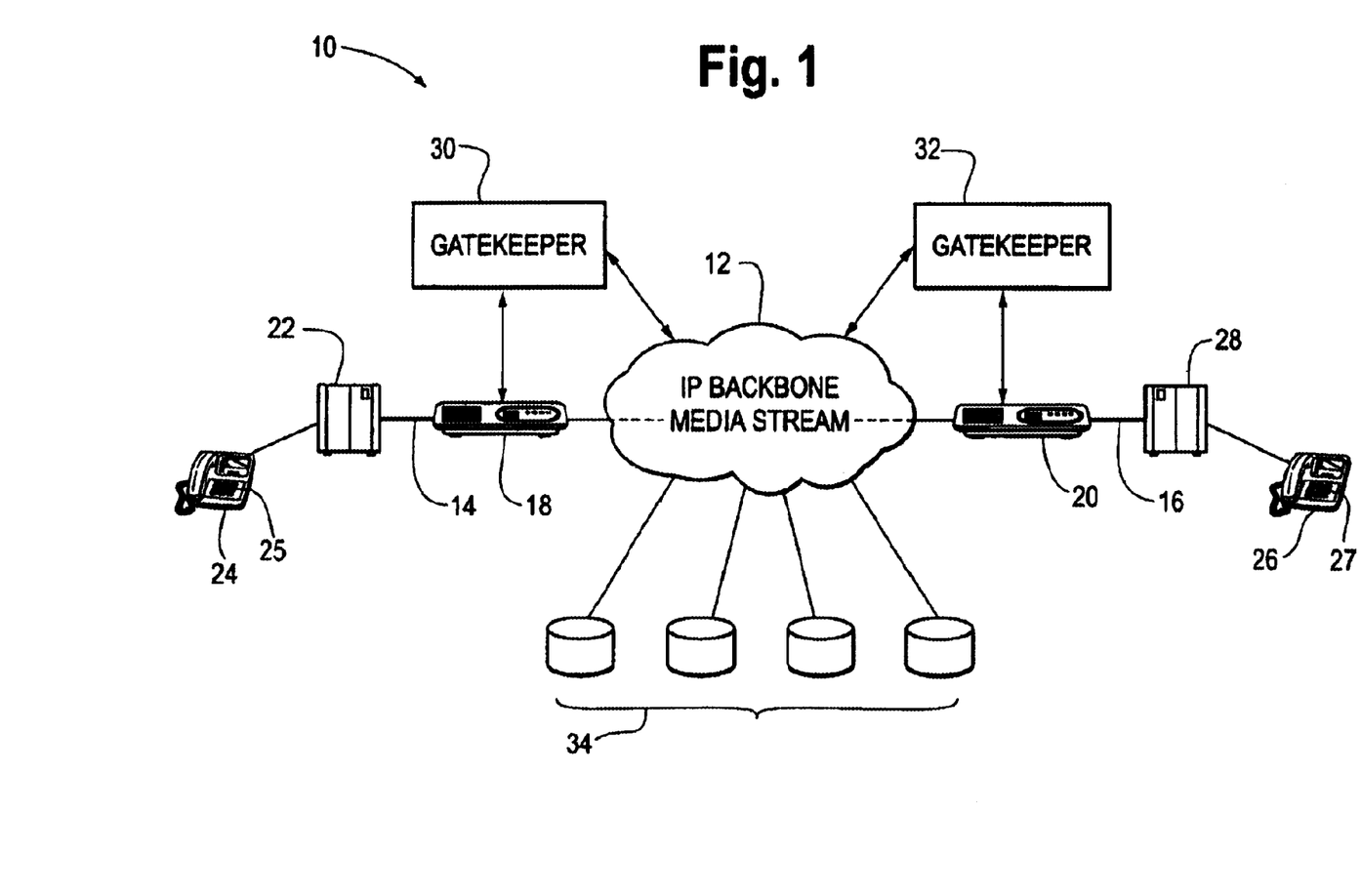
FIG. 1 is a schematic illustration of a representative Internet telephony system in which a preferred embodiment of the present invention may be implemented.

With reference to FIG. 1, a preferred communication system 10 suitable for Internet telephony in which the present invention may be implemented is illustrated schematically. Communication system 10 includes an intermediate network 12 that joins a first edge network 14 with a second edge network 16. Intermediate network 12 is preferably a publicly accessible packet switched network. Most preferably, intermediate network 12 is an IP network, i.e., data is transmitted over it according to the Internet Protocol. For example, intermediate network 12 may be the Internet. Edge networks 14 and 16 are packet switched networks that are typically more localized than intermediate network 12. For example, edge networks 14 and 16 may be local area networks (LANs). Edge networks 14 and 16 will typically be private networks. Data is transmitted over edge networks 14 and 16 according to a reliable transport protocol, such as TCP.

Networks 12, 14 and 16 each define a separate and independent address space. Put another away, a device connected to one of the networks will be identified on that network by an address. For example, if network 12 is an IP network, as is most preferred, devices connected to it will be identified by a 32-bit (4-byte) IP address. This IP address is conventionally represented in dotted decimal notation in which periods separate each byte of the address. Thus, "102.54.94.97" is an example of an IP address that may identify a device connected to network 12. Some transport protocols also allow the addition of a 16-bit port address to distinguish among various destinations having the same IP address. Such addresses are made a part of the data packets transmitted in each network to ensure that the data is routed properly. In particular, data packets that originate from a device will have the device's address as their source addresses, and, data packets that are destined for the device will have the device's address as their destination address.

A first router 18 connects first edge network 14 with intermediate network 12, and a second router 20 connects second edge network 16 with intermediate network 12. Because routers 18 and 20 are each connected to two networks, they have two sets of addresses. Specifically, first router 18 is identified on first edge network 14 by a private first router address and on intermediate network 12 by a public first router address. Similarly, second edge router 20 is identified on second edge network 16 by a private second router address and on intermediate network 12 by a public second router address.

As used herein, the term "public" used in relation to a device's address means that the address identifies the device on intermediate network 12 and does not mean that the address that is necessarily known publicly. Similarly, as used herein, the term "private" used in relation to a device's address means that the address identifies the device on one of edge networks 14 and 16 and does not mean that the address is necessarily kept private.

Routers 18 and 20 transmit data packets from one network to another by performing network address translation, i.e., translation of source and destination addresses from the address space of one network to the address space of another network. For example, first router 18 translates the source and destination addresses of data packets from first edge network 14 into source and destination addresses available in the address space of intermediate network 12 and then transmits the data packets over intermediate network 12. First router 18 similarly performs network address translation in order to transmit data packets from intermediate network 12 to first edge network 14. Second router 20 also performs network address translation in order to transmit data packets between intermediate network 12 and second edge network 16. Port addresses, if any, need not translated by routers 18 and 20, however.

A consequence of the network address translation performed by routers 18 and 20 is that the source and/or destination addresses in a data packet may no longer refer to devices which are actually connected to that network. In such cases, the source and/or destination addresses are "proxy" addresses. The proxy addresses serve to identify devices on a given network that are actually connected to a different network. First and second routers 18 and 20 each have a pool of available proxy public addresses, to identify devices on intermediate network 12, as well as a pool of available of proxy private addresses, to identify devices on edge networks 14 and 16. Moreover, before routers 18 and 20 can perform network addresses, they must allocate any needed proxy addresses from their pool of available proxy addresses.

With reference to FIG. 1, a first telephony interface 22 is connected to first edge network 14, and a caller station 24 is, in turn, connected to first telephony interface 22. Similarly, a callee station 26 is connected to a second telephony interface 28, which, in turn, is connected to second edge network 16. Caller station 24 and callee station 26 may be telephones, fax machines, modems, video devices, or other devices that can use the PSTN (not shown) to transmit and receive signals. Preferably, caller station 24 and callee station 26 are telephones or fax machines, as these devices commonly use the PSTN (not shown) to make long distance calls. Most preferably, caller station 24 and callee station 26 are telephones.

Caller station 24 is associated with a caller station number, and callee station 26 is associated with a callee station number. The station numbers are preferably conventional telephone numbers. Most preferably, each station number is an E.164 number, i.e., a telephone number in accordance with the E.164 recommendation of ITU-T. ITU-T recommendation E.164 is incorporated herein by reference.

Caller station 24 is preferably provided with means, such as a numeric keypad 25, by which a user is able to enter the station number of the station, such as callee station 26, that the user desires to call. Similarly, callee station 26 is preferably provided with a numeric keypad 27.

Telephony interfaces 22 and 28 are preferably broadband telephony interfaces located on the user's premises. Telephony interfaces 22 and 28 may include one or more RJ-11 jacks (not shown), so that the user may attach one or more telephones, fax machines, or modems by means of conventional RJ-11 plugs (not shown). Telephony interfaces 22 and 28 may also include cable modems. In this way, the user's cable television service may be combined with telephone service and Internet access for the user's personal computer. In the case where the telephony interface includes a cable modem, the edge network would be the cable LAN of the local cable television provider.

Telephony interface 22 interfaces caller station 24 with first edge network 14, and telephony interface 28 interfaces callee station 26 with second edge network 16. Specifically, telephony interfaces 22 and 28 convert signals between the format used on the edge networks, namely, digital data packets, and the format used by the attached device, which is often analog. For example, if caller station 24 is an analog telephone, telephony interface 22 would process the caller signal by performing analog to digital conversion on it and would then transmit the digitized signal as data packets in accordance with the protocol used on edge network 14. Similarly, telephony interface 22 would process the callee signal by performing digital to analog conversion on the digital data packets from edge network 14. Telephony interfaces with this capability are described in U.S. Pat. Nos. 5,526,353 and 5,742,596, which patents are incorporated herein by reference.

Telephony interface 22 is identified on first edge network 14 by one or more private addresses, depending on the number of different service lines the user subscribes to. Each line is associated with one of the private addresses of telephony interface 22, as well as a station number, as described above. Additionally, as with conventional telephone service, a user may have more than one telephone or other device on each line. In this way, caller station 24 is identified on first edge network 14 by a private caller address, corresponding to one of the private addresses of telephony interface 22, and is also identified by its caller station number. A user may also have a second telephone or other device (not shown) connected to telephony interface 22, which device may have either the same address (and station number) as caller station 24 or a different address (and station number). Similarly, callee station 26 is identified on second edge network 16 by a private callee address, as well as by its callee station number.

Although FIG. 1 shows only one telephony interface connected to first edge network 14 and only one telephony interface connected to second edge network 16, typically edge networks 14 and 16 will each have a plurality of telephony interfaces connected to it. However, each edge network will typically have only one router connecting it with intermediate network 12. Additionally, although FIG. 1 shows intermediate network 12 connected to only two edge networks, i.e., first edge network 14 and second edge network 16, intermediate network 12 may, in general, be connected to many more edge networks. Each such edge network would typically have a plurality of telephony interfaces, and each connection of intermediate network 12 to such an edge network would occur via a router capable of performing network address translation.

Associated with first router 18 is a first gatekeeper 30, and associated with second. router 20 is a second gatekeeper 32. First gatekeeper 30 controls when first router 18 will allocate proxy public and proxy private addresses from its pool of available addresses. Second gatekeeper 32 similarly controls second router 20. Preferably, first and second gatekeepers 30 and 32 are computers connected to intermediate network 12 and are identified on network 12 by a public first gatekeeper address and a public second gatekeeper addresses, respectively. In this preferred embodiment, first and second gatekeepers 30 and 32 are separate from first and second routers 18 and 20, and they control their associated routers by sending and receiving messages transmitted over network 12. One advantage of this configuration is that a gatekeeper can easily control more than one router, and, thus the data flow to and from more than one edge network. A gatekeeper may also be connected to an edge network, in which case it can control the router on that edge network by sending and receiving messages transmitted over the edge network. In an alternate embodiment, a router can be programmed to perform the gatekeeping functions itself, so that the router and gatekeeper would be different functional aspects of the same device.

With reference to FIG. 1, a back end server 34 is connected to intermediate network 12. Server 34 either includes, or has access to, a database that stores the station numbers of the stations that can be accessed in communication system 10, including the caller and callee station numbers. Server 34 also stores the private addresses of the stations, including the private caller and private callee addresses, the public addresses of the routers, including the public first and second router addresses, and the public addresses of the gatekeepers, including the public first and second gatekeeper addresses, that are part of communication system 10. Preferably, the database used by server 34 is relational so that, given a station number, server 34 is able to determine the private address of the station, as well as the addresses of the router and gatekeeper associated with that station.

Server 34 may also comprise one or more "mirror servers," i.e., servers at other locations that store the same data. Accordingly, server 34 may be identified on intermediate network 12 by a single server address, or, if "mirror servers" are also used, by multiple server addresses.

Figure 2:
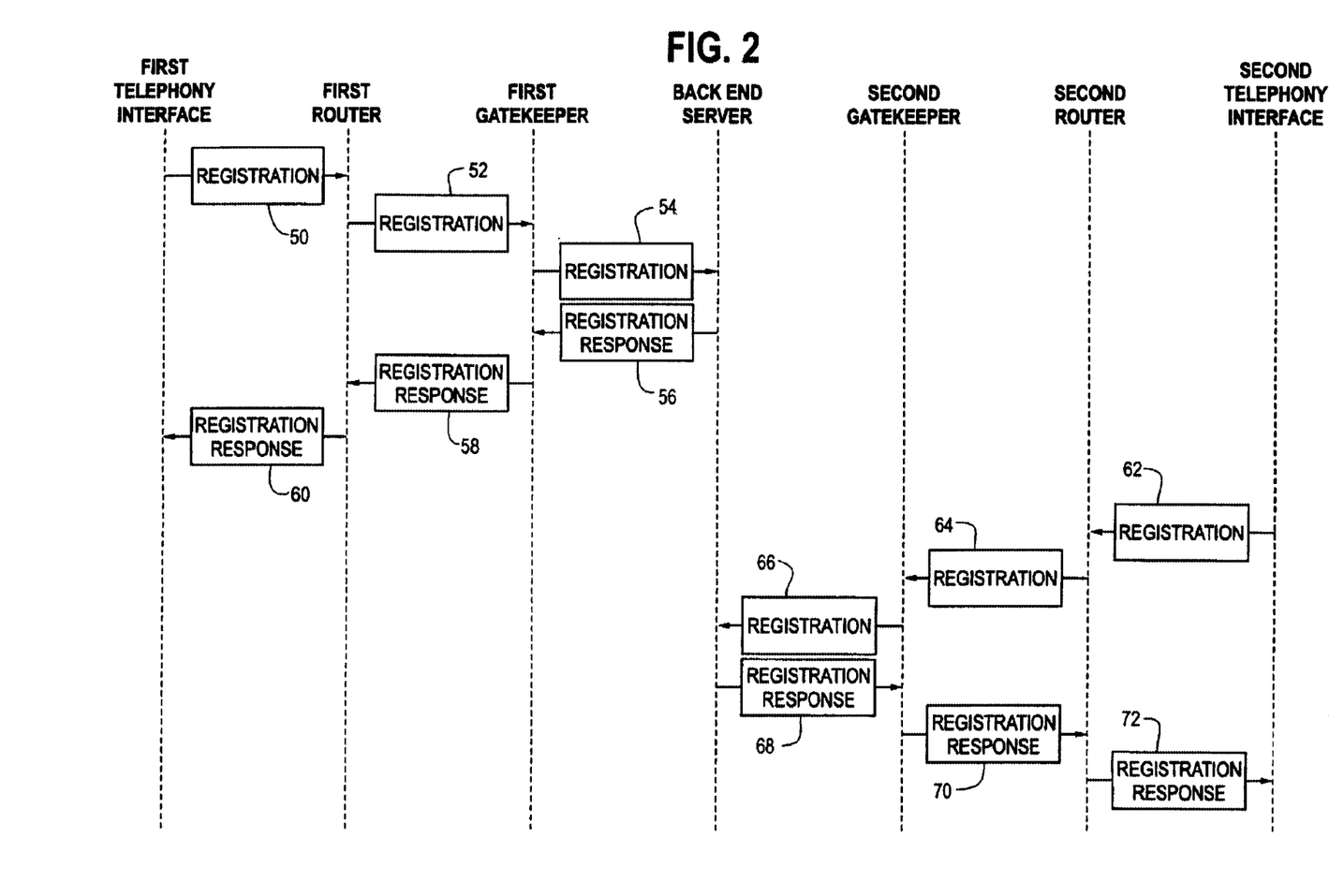
FIG. 2 is schematic illustration of the host registration process in accordance with a preferred embodiment of the present invention.

Shown in FIG. 2 is a host registration process in accordance with a preferred embodiment of the present invention. As noted above, back end server 34 stores various data, including station numbers and router and gatekeeper addresses, that are used in the telephone communication methods of the present invention. Accordingly, before the desired telephone communication can take place, server 34 must be provided with this information in a host registration process.

In the first step (step 50) of the host registration process for registering caller station 24 with server 34, first telephony interface 22 transmits a first registration message over first edge network 14 to first router 18. The first registration message has the private caller address as its source address, the private first router address as its destination address, and includes the caller station number and the private caller address in its payload. In response, first router 22 transmits a second registration message over intermediate network 12 to first gatekeeper 18 (step 52). The second registration message has the public first router address as its source address, the public first gatekeeper address as its destination address, and its payload includes the caller station number, the private caller address, and the public first router address. First gatekeeper 30 then transmits a third registration message over intermediate network 12 to server 34 (step 54). The third registration message has the public first gatekeeper address as its source address, the server address as its destination address, and its payload includes the caller station number, the private caller address, the public first router address, and the public first gatekeeper address. When server 34 receives the third registration message, it stores the information in its database. In this way, server 34 associates the caller station number with the private caller address, the public first router address, and the public first gatekeeper address.

To indicate that it received the information successfully, server 34 transmits a registration response message over intermediate network 12 to first gatekeeper 30 (step 56). First gatekeeper 30 then forwards this message to first router 18 (step 58), which, in turn, forwards it to first telephony interface 22 (step 60).

The process of registering callee station 26 with server 34 is similar. A cascade of registration messages (steps 62–66) transmit the callee station number, private callee address, public second router address, and public second gatekeeper address to server 34. Server 34 stores this information and sends back a registration response message that is ultimately forwarded to second telephony interface 28 (steps 68–72).

Once caller station 24 and callee station 26 are registered with server 34, caller station 24 is able to place a telephone call to callee station 26. The process of setting up a telephone call from caller station 24 to callee station 26 is illustrated schematically in FIG. 3. The process begins with the user of caller station 24 entering the callee station number, such as by pressing the appropriate numbers on keypad 25. This action causes telephony interface 22 to transmit a setup message over first edge network 14 to first router 18 (step 80). This setup message has the private caller address as its source address, the private first router address as its destination address, and includes the callee station number. In response, first edge router 18 transmits a forwarded setup message over intermediate network 12 to first gatekeeper 30 (step 82). The forwarded setup message has the public first router address as its source address, the public first gatekeeper address as its destination address, and includes both the callee station number and the private caller address. First gatekeeper 30 stores the private caller address in order to determine later how the call should be billed.

Figure 3:
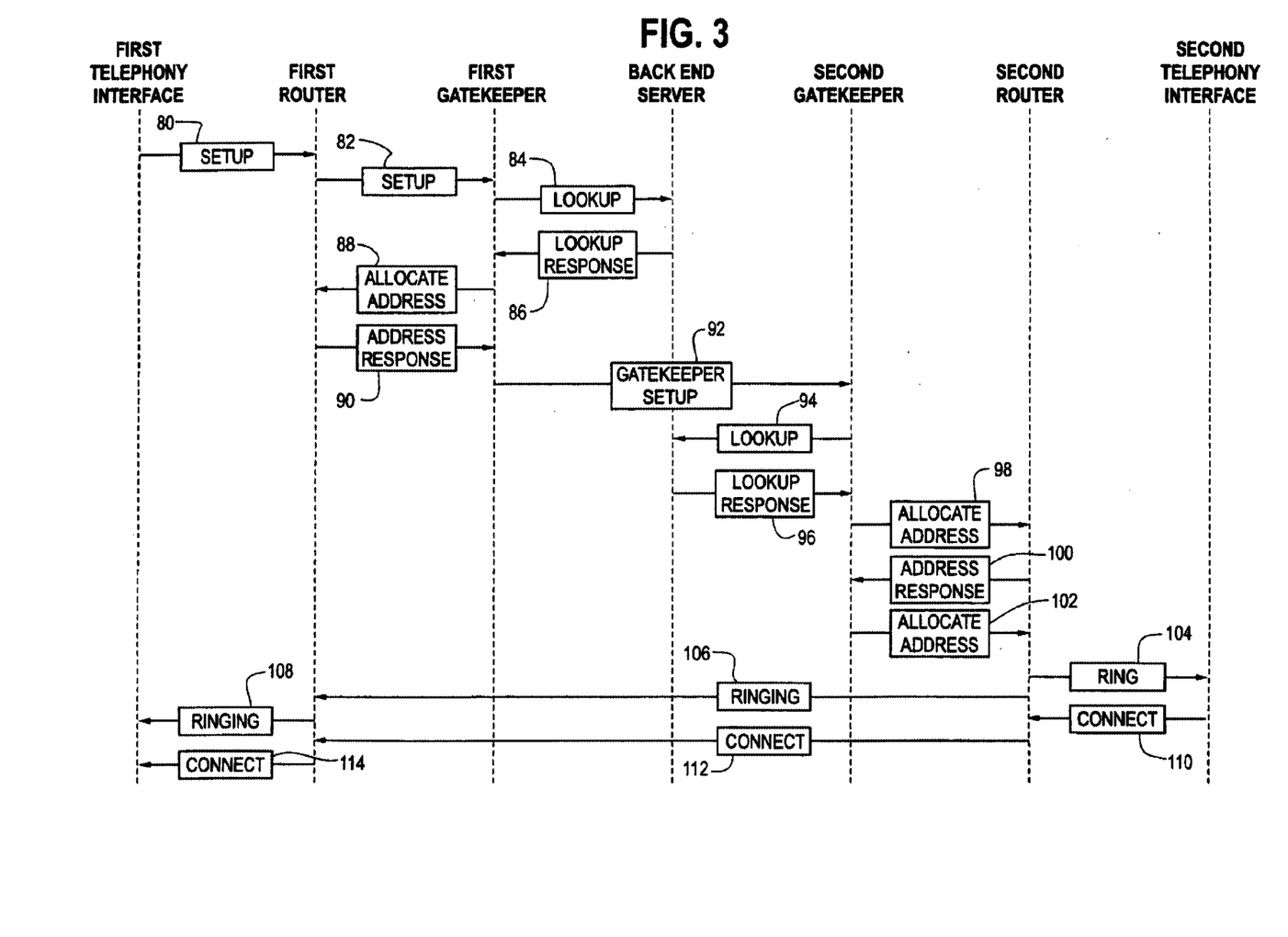
FIG. 3 is a schematic illustration of the call setup process in accordance with a preferred embodiment of the present invention.

In order to determine the address in charge of callee station 26, first gatekeeper transmits a first lookup message over intermediate network 12 to server 34 (step 84). The first lookup message has the public first gatekeeper address as its source address, the server address as its destination address, and includes the callee station number in its payload. When server 34 receives the first lookup message, it looks up the callee station number in its database. Server 34 then response by transmitting a first lookup response message back to first gatekeeper 30 (step 86). The first lookup response message contains the public second gatekeeper address.

When first gatekeeper 30 receives the first lookup response message, it responsively transmits a first address allocation message over intermediate network 12 to first router 18 (step 88). The first address allocation message has the public first gatekeeper address as its source address, the public first router address as its destination address, and it includes the private caller address in its payload. In response, first router 18 allocates, from its pool of available public address, a proxy public caller address. The proxy public caller address will serve to identify caller station 24 on intermediate network 12. First router 18 then transmits a first address response message over intermediate network 12 to gatekeeper 30 (step 90). The first address response message has the public first router address as its source address, the public first gatekeeper address as its destination address, and includes the proxy public caller address allocated by first router 18.

With the proxy public caller address now allocated, gatekeeper 30 transmits a gatekeeper setup message over intermediate network 12 to second gatekeeper 32 (step 92). The gatekeeper setup message has the public first gatekeeper address as its source address, the public second gatekeeper address as its destination address, and its payload includes the callee station number and the proxy public caller address.

In response, second gatekeeper 32 transmits a second lookup message over intermediate network 12 to server 34 (step 94). The second lookup message has the public second gatekeeper address as its source address, the server address as its destination address, and it includes the callee station number in its payload. Server 34 then looks up the callee station number in its database. Server 34 transmits a second lookup response message over intermediate network 12 to second gatekeeper 32 (step 96). The second lookup response message includes the public second router address and the private callee address.

Second gatekeeper 32 responsively transmits over intermediate network 12 to second router 20 a second address allocation message (step 98). The second address allocation message has the public second gatekeeper address as its source address and the public second router address as its destination address, and it includes the private callee address in its payload. In response to this message, second router 20 allocates, from its pool of available public addresses, a proxy public callee address. The proxy public callee address will serve to identify callee station 26 on intermediate network 12. Second router 20 transmits a second address response message over intermediate network 12 to second gatekeeper 32 (step 100). The second address response message includes in its payload the proxy public callee address allocated by second router 20.

Second gatekeeper 32 then transmits a third address allocation message over intermediate network 12 to second router 20 (step 102). The third address allocation message has the public second gatekeeper address as its source address, the public second router address as its destination address, and its payload includes the proxy public caller address.

In response, second router 20 allocates, from its pool of available private addresses, a proxy private caller address. The proxy private caller address will serve to identify caller station 24 on second edge network 16. Second router 20 then sends a ring message over second edge network 16 to second telephony interface 28 (step 104). The ring message has the proxy private caller address as its source address and the private callee address as its destination address. The ring message provides an indication to callee station 26 that a telephone call has been directed to it. Preferably, callee station 26 will ring in response, or provide some other user-discernible indication of the incoming telephone call. Second router 32 also transmits an originating ringing message over intermediate network 12 to first router 30 (step 106). The originating ringing message has the proxy public callee address as its source address and the proxy public caller address as its destination address.

When first router 30 receives the originating ringing message, it allocates, from its pool of available private addresses, a proxy private callee address. The proxy private callee address will serve to identify callee station 26 on first edge network 14. First router 30 then performs network address translation on the ringing message. Specifically, it translates the proxy public callee address to the proxy private callee address, and it translates the proxy public caller address to the private caller address. First router 30 then transmits a ringing message over first edge network 14 to first telephony interface 22 (step 108). The ringing message has the proxy private callee address as its source address and the private caller address as its destination address. The ringing message provides-an indication, preferably a user-discernible indication, that callee station 26 has not yet answered the telephone call.

When the user of callee station 26 answers the call, second telephony interface 28 transmits a first originating connect message over second edge network 16 to second router 20 (step 110). The first originating connect message has the private callee address as its source address and the proxy private caller address as its destination address. Second router 20 performs network address translation on the first originating connect message by translating the private callee address to the proxy public callee address and translating the proxy private caller address to the proxy public caller address. Second router 20 then transmits a second originating connect message over intermediate network 12 to first router 18 (step 112). This second originating connect message has the proxy public callee address as its source address and the proxy public caller address as its destination address.

When first router 18 receives the second originating connect message, it performs network address translation on it by translating the proxy public callee address to the proxy private callee address and translating the proxy public caller address to the private caller address. First router 18 then transmits a connect message over first edge network 14 to first telephony interface 22 (step 114). This connect message has the proxy private callee address as its source address and the private caller address as its destination address. The connect message provides an indication, preferably a user-discernible indication, to caller station 24 that callee station 26 has answered the telephone call.

With caller station 24 connected to callee station 26, telephone communication may now take place. Specifically, caller signals may be transmitted from caller station 24 to callee station 26 and callee signals may be transmitted from callee station 26 to caller station 24. This telephone communication is illustrated schematically in FIG. 4.

Figure 4:
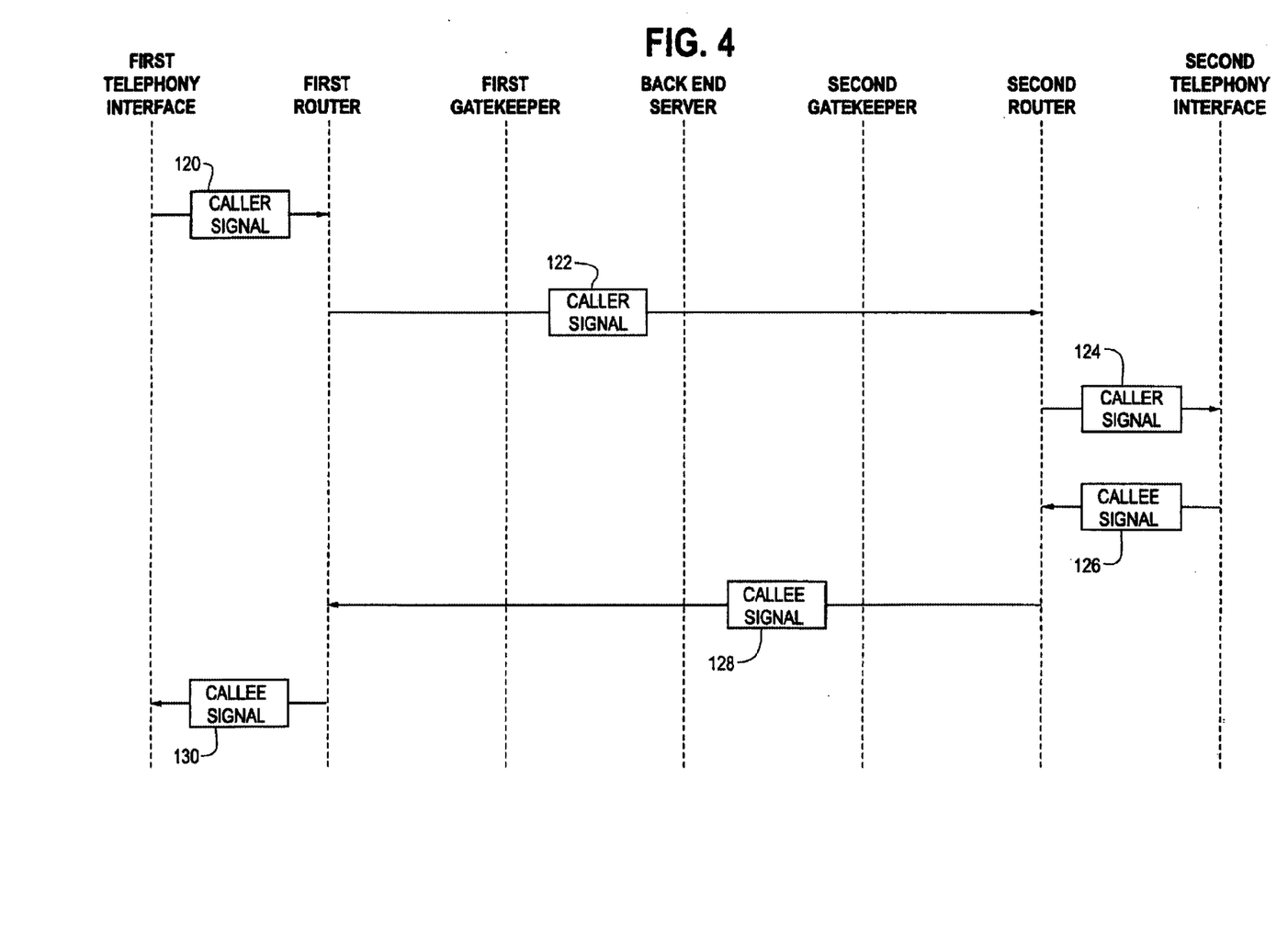
FIG. 4 is a schematic illustration of the call flow in accordance with a preferred embodiment of the present invention.

First telephony interface 22 receives the caller signal produced by caller station 24. The nature of this caller signal will depend on what type of device caller station 24 is. For example, if caller station 24 is a telephone, the caller signal will typically contain voice information. If caller station 24 is a fax machine, the caller signal will typically contain image data encoded in accordance with a facsimile standard. If caller station 24 is a modem, the caller signal will typically be data modulated in accordance with a modem standard. If caller station 24 is a video device, the caller signal will typically contain video encoded in accordance with a video standard.

First telephony interface 22 processes the caller signal to produce digital data packets in accordance with the protocol used on first edge network 14. First telephony interface then transmits the caller signal over first edge network 14 to first router 18 (step 120). This caller signal comprises first caller data packets having the private caller address as their source addresses and the proxy private callee address as their destination addresses.

First router 18 performs network address translation on the first caller data packets by translating the private caller address into the public caller address and translating the proxy private callee address into the proxy public callee address. First router 22 then transmits the caller signal over intermediate network 12 to second router 20 (step 122). This caller signal comprises second caller data packets having the proxy public caller address as their source addresses and the proxy public callee address as their destination addresses.

Second router 20 performs network address translation on the second caller data packets by translating the proxy public caller address into the proxy private caller address and translating the proxy public callee address into the private callee address. Second router 20 then transmits the caller signal over second edge network 16 to second telephony interface 28 (step 124). This caller signal comprises third caller data packets having the proxy private caller address as their source addresses and the private callee address as their destination addresses. Second telephony interface 28 then processes this caller signal into a form that can be used by callee station 26.

The process of transmitting a callee signal from callee station 26 to caller station 24 is similar. Second telephony interface receives the callee signal produced by caller station 26. The nature of the callee signal will depend on whether callee station 26 is a telephone, fax machine, modem, video device, or some other device. Second telephony interface 26 processes the callee signal to produce digital data packets in accordance with the protocol used on second edge network 16. Second telephony interface 28 then transmits the callee signal over second edge network 16 to second router 20 (step 126). Second router 20 performs network address translation on the callee signal by translating the source addresses (i.e., by translating the private callee address into the proxy public callee address) and the destination addresses (i.e., by translating the proxy private caller address into the proxy public caller address). Second router 20 then transmits the callee signal over intermediate network 12 to first router 18 (step 128). First router 18 translates the source addresses (i.e., by translating the proxy public callee address into the proxy private callee address) and the destination addresses (i.e., by translating the proxy public caller address into the private caller address) of the data packets comprising the callee signal. First router 18 then transmits the callee signal to first telephony interface 22 (step 130). First telephony interface 22 processes this callee signal into a form useable by caller station 24.

As disclosed herein, the preferred embodiment of the present invention provides a system and a method for Internet telephony that does not use the PSTN at all. Instead, caller station 24 and callee station 26 are connected directly to digital networks, namely edge networks 14 and 16, which, in turn have direct access to the Internet (i.e., to intermediate network 12), via routers 18 and 20. Accordingly, a user of caller station 24 can call callee station 26 directly by simply entering the callee station number on keypad 25, rather than first calling an Internet telephony service provider.

Additionally, Internet addresses are conserved because proxy caller and callee addresses are allocated on intermediate network 12 only when a call is made. Once the call is concluded, these proxy addresses would then be available for others to use. What makes this possible is the use of network address translation to translate between the address spaces of first edge network 14 and intermediate network 12 and between intermediate network 12 and second edge network 16.

The use of proxy addresses also adds a measure of privacy. In particular, because callee station 26 is identified by a proxy address on first edge network 14 and by another proxy address on intermediate network 12, the user of caller station 24 cannot easily determine the callee's private callee address. Similarly, the user of callee station 26 cannot easily determine the caller's private caller address. A measure of mutual anonymity is thus provided.

Finally, because multiple components, namely two routers, two gatekeepers, and a back end server, must work together to set up a call, security is enhanced. Accordingly, even if an intruder were to gain control over one of the elements, he still may not be able to make unauthorized calls.

Although various embodiments of this invention have been shown and described, it should be understood that various modifications and substitutions, as well as rearrangements and combinations of the preceding embodiments, can be made by those skilled in the art, without departing from the novel spirit and scope of this invention. Accordingly, the true spirit and scope of the invention is defined by the appended claims, to be interpreted in light of the foregoing specification.

We claim:

1. In a communication system comprising a first edge network and an intermediate network, said first edge network being connected to said intermediate network, each of said networks carrying digital data comprising data packets, each of said data packets having a source address and a destination address, a method for setting up a call over said intermediate network from a caller station to a callee station, said caller station being connected to said first edge network and identified on said first edge network by a private caller address, said callee station being accessible via said intermediate network, said callee station being associated with a callee station number, said method comprising the steps of:

receiving a setup message over said first edge network, said setup message having said private caller address as its source address and a private first router address as its destination address, said setup message including said callee station number;

in response to receiving said setup message, transmitting a forwarded setup message to a first gatekeeper, said forwarded setup message having a public first router address as its source address and a public first gatekeeper address as its destination address, said forwarded setup message including said callee station number and said private caller address;

allocating a proxy public caller address to identify said caller station on said intermediate network; and allocating a proxy private callee address to identify said callee station on said first edge network.

2. The method of claim 1, further comprising the step of:

transmitting a first address response message to said first gatekeeper, said first address response message including said proxy public caller address.

3. The method of claim 2, further comprising the step of:

transmitting a ringing message to said caller station over said first edge network, said ringing message having said proxy private callee address as its source address and said private caller address as its destination address, said ringing message providing an indication to said caller station that said callee station has not yet answered said call.

4. The method of claim 3, further comprising the step of:

transmitting a connect message to said caller station over said first edge network, said connect message having said proxy private callee address as its source address and said private caller address as its destination address, said connect message providing an indication to said caller station that said callee station has answered said call.

5. The method of claim 4, wherein said communication system further includes a second edge network connected to said intermediate network, and wherein said callee station is connected to said second edge network and identified on said second edge network by a private callee address, further comprising the steps of:

allocating a proxy public callee address to identify said callee station on said intermediate network; and allocating a proxy private caller address to identify said caller station on said second edge network.

6. The method of claim 5, further comprising the step of:

transmitting a second address response message to a second gatekeeper, said second address response message including said proxy public callee address.

7. The method of claim 6, further comprising the step of:

transmitting a ring message to said callee station over said second edge network, said ring message having said proxy private caller address as its source address and said private callee address as its destination address, said ring message providing an indication to said callee station that said call has been directed to said callee station.

8. The method of claim 7, further comprising the step of:
said first gatekeeper transmitting a first lookup message to a server, said first lookup message including said callee station number.

9. The method of claim 8, further comprising the step of:
in response to said first lookup message, said server transmitting a first lookup response message to said first gatekeeper, said first lookup response message including an address identifying said second gatekeeper on said intermediate network.

10. The method of claim 9, further comprising the step of:
said first gatekeeper transmitting a gatekeeper setup message to said second gatekeeper over said intermediate network, said gatekeeper setup message including said callee station number and said proxy public caller address.

11. The method of claim 10, further comprising the step of:
said second gatekeeper transmitting a second lookup message to said server, said second lookup message including said callee station number.

12. The method of claim 11, further comprising the step of:
in response to said second lookup message, said server transmitting a second lookup response message to said second gatekeeper, said second lookup response message including said private callee address.

13. The method of claim 12, wherein a first router performs the step of allocating said proxy public caller address in response to receiving a first address allocation message from said first gatekeeper.

14. The method of claim 13, wherein a second router performs the step of allocating said proxy public callee address in response to receiving a second address allocation message from said second gatekeeper.

15. The method of claim 14, wherein said second router performs the step of allocating said proxy private caller address in response to receiving a third address allocation message from said second gatekeeper.

16. The method of claim 15, wherein said first router performs the step of allocating said proxy private callee address and the step of transmitting said ringing message to said caller station in response to receiving an originating ringing message from said first router.

17. The method of claim 16, further comprising the step of:
a first telephony interface transmitting said setup message to said first router when a user enters said callee station number into said caller station.

18. The method of claim 17 further comprising the steps of:
said callee station providing a user-discernible indication in response to said ring message; and
said caller station providing a user-discernible indication in response to said ringing message.

19. The method of claim 18, further comprising the steps of
a second telephony interface transmitting an originating connect message when said caller station answers said call; and
said second router forwarding said originating connect message to said first router,
wherein said first router performs the step of transmitting said connect message to said caller station in response to receiving said originating connect message.

20. A method for registering a caller station with a server, said caller station being associated with a caller station number, said caller station being connected to an edge network via a telephony interface, said edge network being connected to an intermediate network via a router, said router being controlled by a gatekeeper, said caller station being identified on said edge network by a caller address, said router being identified on said intermediate network by a public router address, said gatekeeper being identified on said intermediate network by a public gatekeeper address, said server being connected to said intermediate network, said method comprising the steps of:
said server receiving a third registration message from said gatekeeper over said intermediate network, said third registration message including said caller station number, said caller address, said public router address, and said public gatekeeper address; and
said server storing said caller station number, said caller address, said public router address, and said public gatekeeper address in a database.

21. The method of claim 20, further comprising the step of:
said gatekeeper transmitting said third registration message over said intermediate network to said server.

22. The method of claim 21, further comprising the step of:
said router transmitting a second registration message over said intermediate network to said gatekeeper, said second registration message including said caller station number, said caller address, and said public router address.

23. The method of claim 22, further comprising the step of:
said telephony interface transmitting a first registration message over said edge network to said router, said first registration message including said caller station number and said caller address.

24. The method of claim 23, further comprising the step of:
said server transmitting a response message over said intermediate network to said gatekeeper.

25. The method of claim 24, further comprising the step of:
said gatekeeper forwarding said response message to said router.

26. The method of claim 25, further comprising the step of:
said router forwarding said response message to said telephony interface.

27. A system for setting up a call between a caller station and a callee station, said caller station being connected to a first edge network, said callee station being accessible via an intermediate network, said intermediate network being connected to said first edge network via a first router, said caller station being identified on said first edge network by a private caller address, said first router being able to allocate a proxy public caller address from a pool of available proxy public addresses to identify said caller station on said intermediate network and a proxy private callee address from a pool of available proxy private addresses to identify said callee station on said first edge network, said callee station being associated with a callee station number, said system comprising:

a first gatekeeper for controlling when said first router allocates said proxy public caller address from said pool of available proxy public addresses and said proxy private callee address from said pool of available proxy private addresses, said first gatekeeper being connected to said intermediate network.

28. The system of claim 27, wherein said first gatekeeper controls said first router by sending and receiving messages transmitted over said intermediate network.

29. The system of claim 28, wherein said gatekeeper is programmed to transmit a first lookup message over said intermediate network to a server in response to receiving a setup message, said setup message including said callee station number, said first lookup message including said callee station number.

30. The system of claim 29, wherein said callee station is connected to a second edge network and identified on said second private network by a private callee address, and wherein a second router connects said second edge network to said intermediate network, said second router being able to allocate a proxy public callee address to identify said callee station on said intermediate network and a proxy private caller address to identify said private caller station on said second edge network, said system further comprising:

a second gatekeeper for controlling when said second router allocates said proxy public callee address and said proxy private caller address, said second gatekeeper being connected to said intermediate network.

31. The system of claim 30, wherein said second gatekeeper controls said second router by sending and receiving messages transmitted over said intermediate network.

32. The system of claim 31, wherein said second gatekeeper is programmed to transmit a second lookup message over said intermediate network to said server in response to receiving a gatekeeper setup message from said first gatekeeper, said gatekeeper setup message including said callee station number and said proxy public caller address, said second lookup message including said callee station number.

* * * * *